US009513363B2

(12) United States Patent
Versteeg

(10) Patent No.: US 9,513,363 B2
(45) Date of Patent: *Dec. 6, 2016

(54) SYSTEM AND METHOD FOR DETERMINING ANTENNA PROBABILITIES IN SUB-AREAS OF A GEOGRAPHICAL AREA

(71) Applicant: Swisscom AG, Bern (CH)

(72) Inventor: Ernst Versteeg, Bern (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,194

(22) Filed: Sep. 29, 2015

(65) Prior Publication Data
US 2016/0131736 A1 May 12, 2016

Related U.S. Application Data

(63) Continuation of application No. 14/457,435, filed on Aug. 12, 2014, now Pat. No. 9,146,297, which is a (Continued)

(30) Foreign Application Priority Data

Dec. 13, 2007 (EP) ..................... 07405354

(51) Int. Cl.
*H04W 24/00* (2009.01)
*G01S 5/02* (2010.01)
*H04W 4/02* (2009.01)

(52) U.S. Cl.
CPC ............ *G01S 5/0278* (2013.01); *G01S 5/0252* (2013.01); *H04W 4/021* (2013.01); *H04W 24/00* (2013.01)

(58) Field of Classification Search
CPC ........ G01S 5/0252; G01S 5/0278; G01S 5/02; G01S 5/021; G01S 5/0236; G01S 5/0294; G01S 5/0257; G01S 5/0009; G01S 5/0289; G01S 2205/006; G01S 5/0284; G01S 5/14; G01S 11/06; G01S 5/0018
(Continued)

(56) References Cited

U.S. PATENT DOCUMENTS 6,564,064 B1 5/2003 Ciganer et al.
8,145,237 B2 3/2012 Versteeg
(Continued)

FOREIGN PATENT DOCUMENTS

EP 1302783 4/2003
GB 2352134 1/2001

*Primary Examiner* — Kwasi Karikari
(74) *Attorney, Agent, or Firm* — McAndrews, Held & Malloy, Ltd.

(57) ABSTRACT

Methods and systems are provided for determining signal source probabilities. Signal source probabilities, for a plurality of sub-areas of a geographic area covered by a plurality of signal sources, may be determined. For each one of the plurality of sub-areas, the signal source probabilities may be determined based on probable field strengths of the plurality of signal sources for the one of the plurality of sub-areas, and the signal source probabilities for that one of the plurality of sub-areas indicate the probability that a mobile device, located in that one of the plurality of sub-areas, is operable to detect a particular signal source for communicating. Determining signal source probabilities may comprise calculating expected field strengths in the plurality of sub-areas. Determining signal source probabilities may comprise obtaining power information indicating a detected power of respective signals received by the mobile device from multiple transmitters.

20 Claims, 3 Drawing Sheets

Related U.S. Application Data continuation of application No. 13/780,973, filed on Feb. 28, 2013, now Pat. No. 8,805,412, which is a continuation of application No. 13/397,183, filed on Feb. 15, 2012, now Pat. No. 8,452,304, which is a continuation of application No. 12/254,355, filed on Oct. 20, 2008, now Pat. No. 8,145,237.

(58) Field of Classification Search
USPC ........................................................ 455/456.1
See application file for complete search history.

(56) References Cited

U.S. PATENT DOCUMENTS

| | | | |
|---|---|---|---|
| 8,452,304 B2 | 5/2013 | Versteeg | |
| 9,146,297 B2 * | 9/2015 | Versteeg | G01S 5/0252 |
| 2002/0042268 A1 | 4/2002 | Cotanis | |
| 2004/0067759 A1 | 4/2004 | Spirito et al. | |
| 2004/0203880 A1 | 10/2004 | Riley | |
| 2005/0255855 A1 * | 11/2005 | Spirito | G01S 5/0252 |
| | | | 455/456.1 |
| 2005/0267677 A1 | 12/2005 | Poykko et al. | |
| 2007/0001867 A1 | 1/2007 | Rowe et al. | |
| 2007/0207816 A1 | 9/2007 | Spain, Jr. | |
| 2009/0156231 A1 | 6/2009 | Versteeg | |

* cited by examiner

SYSTEM AND METHOD FOR DETERMINING ANTENNA PROBABILITIES IN SUB-AREAS OF A GEOGRAPHICAL AREA

CLAIM OF PRIORITY

This application is a continuation of U.S. patent application Ser. No. 14/457,435, filed on Aug. 12, 2014, which is a continuation of U.S. patent application Ser. No. 13/780,973, filed on Feb. 28, 2013, which in turn is a continuation of U.S. patent application Ser. No. 13/397,183, filed on Feb. 15, 2012, which in turn is a continuation of U.S. patent application Ser. No. 12/254,355, filed on Oct. 20, 2008, and which claims foreign priority from European (EP) Patent Application Serial No. 07405354.7, filed on Dec. 13, 2007. Each of above stated applications is hereby incorporated herein by reference in its entirety.

FIELD OF THE INVENTION

The present invention relates to a system and a method for locating a mobile communication terminal in a geographical area. Specifically, the present invention relates to a computer system and a computer-implemented method for locating a mobile communication terminal associated with a mobile radio network covering the geographical area.

BACKGROUND OF THE INVENTION

For various location based services as well as for handling emergency situations, it is essential to determine as accurately as possible the geographical location of a user of a mobile communication terminal. Mobile communication terminals include, for example, mobile radio (cellular) telephones or personal digital assistants (PDA) as well as other portable computers with communication modules for mobile radio networks, such as GSM (Global System for Mobile Communication) or UMTS (Universal Mobile Telecommunication System). Although there are mobile communication terminals available which include a GPS-receiver (Global Positioning System) or another satellite-based positioning system, there is still a need for other location methods, as for example locating mobile communication terminals which are not equipped with such positioning systems, mobile communication terminals which have their GPS turned off or inside of buildings where the GPS signal is too weak. It is known from the mobile network which antenna the user is using. However, particularly in rural areas, an area served by an antenna can cover a very large geographical area. Unfortunately today calculations of these areas are not accurate, often they are too large or they are not reliable, and in reality mobile communication terminals are often located outside of these areas (low hit rate).

GB 2352134 describes a method of locating a mobile telephone based on a calculation of expected signal properties such as signal strength or observed time differences for a plurality of possible locations, e.g. arranged in a grid. The expected signal property is compared to a measured signal property. Based on the comparison, determined is the probability that the mobile telephone is at one or more of the locations. Thus, the method of GB 2352134 is based on the actual values of the field strength or time differences measured at the mobile telephone. However, these values would have to be transmitted from the mobile telephones to a centralized measuring system and are therefore not necessarily available for locating a mobile telephone. Furthermore, manufacturers of proprietary network components do not necessarily make such values available to the operators of mobile networks or they sell them at considerable cost. The method does also fail when there are less than 3 antennas available, or if the visible antennas are arranged along a line, for example, in mountain areas.

SUMMARY OF THE INVENTION

It is an object of this invention to provide a system and a method for locating a mobile communication terminal in a geographical area, which system and method do not have some of the disadvantages of the prior art. In particular, it is an object of this invention to provide a system and a method for locating a mobile communication terminal in a geographical area with accuracy beyond cell level, but without the need for measuring at the mobile communication terminal signal properties such as signal strength or observed time differences. In particular, it is a further object of this invention to provide a system and a method for locating a mobile communication terminal in a geographical area where there is only coverage of one or two antennas or where the coverage is only provided by antennas arranged along a line.

According to the present invention, these objects are achieved particularly through the features of the independent claims. In addition, further advantageous embodiments follow from the dependent claims and the description.

According to the present invention, the above-mentioned objects are particularly achieved in that, for locating a mobile communication terminal associated with a mobile radio network covering a geographical area, the geographical area is divided into a plurality of sub-areas. For example, the geographical area is divided into sub-areas of equal shape and size, having a diameter in the range of 50 to 150 meters. For example, the sub-areas are squares arranged in a grid, or hexagons arranged in a comb structure. Based on field strengths expected in the sub-areas for antennas located in the geographical area, antenna probabilities are determined for the sub-areas. The antenna probabilities indicate for at least some of the antennas, the probability that the mobile communication terminal, when located in a particular sub-area, uses the respective antenna. For example, for a sub-area, the antenna probabilities are determined for a limited number of antennas that have the strongest field strengths expected in the respective sub-area, e.g. for each sub-area, the antenna probabilities are determined for the 7 or 14 antennas having the strongest expected field strength in the sub-area. Determined is the antenna used by the mobile communication terminal, e.g. the current antenna (for determining the current location) or the antenna used (for determining the current or last known location) from identification data provided by the mobile radio network, such as cell or base station identification data, or an antenna associated with the user or the mobile communication terminal, respectively, by an operator, for example (e.g. for determining a historical or hypothetical location). Subsequently, for the sub-areas location probabilities are determined based on the antenna probabilities associated with the antenna used, each location probability indicating the probability that the mobile communication terminal is located in the respective sub-area. Determining and storing for the antennas probabilities that indicate the likelihood that the mobile communication terminal, when located in a particular sub-area, uses the respective antenna, makes it possible to locate the mobile communication terminal in the geographical area based on the antenna used, whereby the determined location area of the mobile user is much smaller than the area each antenna covers physically, but without the need for measuring at the mobile communication terminal signal properties such as signal strength or observed time differences, and without the requirement to have everywhere coverage of at least three antennas not arranged along a line.

In a preferred embodiment, the antenna probabilities for the sub-areas are determined based on normal distributions of the field strengths expected in the sub-areas from the antennas. Using normal distributions of the expected and/or simulated field strengths takes into consideration that the real field strength varies within a sub-area depending on a variety of factors such as the actual position within the sub-area, the current weather conditions, the type of communication terminal used, and how the communication terminal is held by the user, i.e. oriented in space.

In a further embodiment, different standard deviations are used for the distributions of the expected field strengths, higher values of the standard deviation being used with increasing distance between antenna and sub-area. Thus, it is possible to take into consideration higher deviations of the field strength for locations more remote from the antenna. It is also possible to consider different deviations of field strength distribution, depending on the type of mobile radio network technology, e.g. different deviations for a GSM or UMTS-network.

In a further embodiment, the antenna probabilities are refined using distributions of the distance between the mobile communication terminal and an antenna, the distributions being estimated in advance based on parameters provided by the mobile radio network. Specifically, large areas with at least a minimum antenna probability are reduced in size, if the network does not only deliver the antenna which was used by the mobile terminal of the user, but also parameters which indicate the distance between the mobile terminal and its antenna, as for example TA (timing advance) or RTT (round trip time) parameters. In this case, for each value of TA or RTT the distribution of distances to the antenna is measured in advance in the field. These distributions are used to improve the calculation of antenna probability at each sub-area.

In an embodiment, for enclosed spaces, e.g. a tunnel, a building or different floors in shops or railway stations, the antenna probabilities are determined from maps outlining the enclosed spaces, and for each of the enclosed spaces the antenna probability of the antenna serving the respective enclosed space is set to a value which is provided on the map or to 100%. Thus, it is possible to determine efficiently, if a user is located in an enclosed space.

In yet another embodiment, the location probabilities are refined using cumulated historical location probabilities, each of the historical location probabilities considering distances traveled by the user. Specifically, the areas can be reduced even more in size using a sequence of older location determinations, for example three location determinations every three minutes, taking into account the fact that users can only travel with a given maximum speed from older positions to the current position. This does allow combining several location probabilities to a combined location probability which covers a much smaller area than the result from one location determination. The calculation can be performed online, combining online location probabilities pre-calculated for each antenna.

In addition to a computer system and a computer-implemented method for locating a mobile communication terminal associated with a mobile radio network covering a geographical area, the present invention also relates to a computer program product including computer program code means for controlling one or more processors of a computer system, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
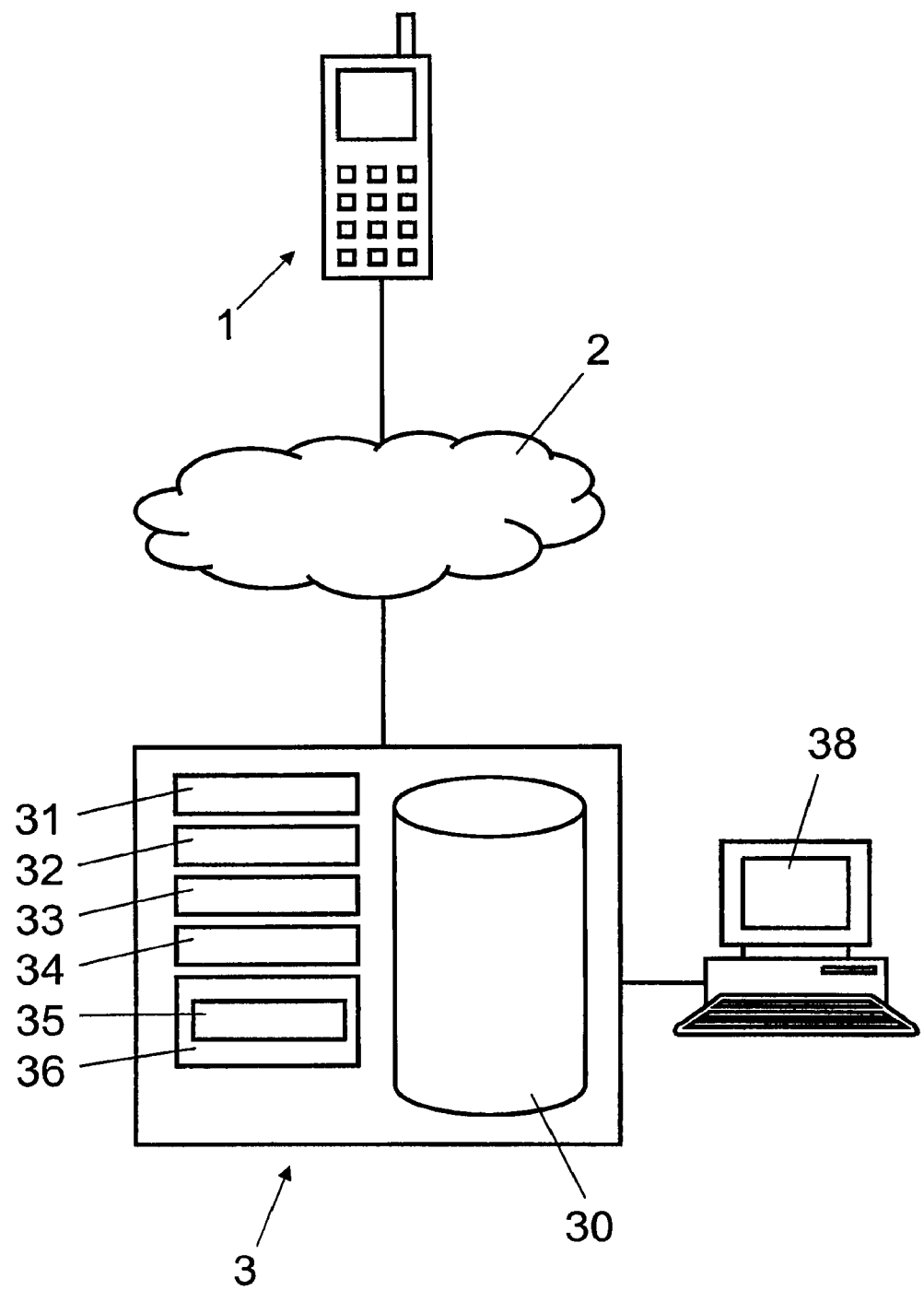
FIG. 1 shows a block diagram illustrating schematically an exemplary configuration of a system for locating a mobile communication terminal associated with a mobile radio network.

In FIG. 1, reference numeral 1 refers to a mobile communication terminal such as a mobile radio (cellular) telephone, a PDA or another portable computer. The mobile communication terminal 1 comprises a communication module for communicating (voice and/or data) via mobile radio network 2, e.g. a GSM or UMTS network or another cellular radio network. As illustrated schematically in FIG. 3, the cellular network comprises a plurality of antennas A1, A2, A3, A4, each covering a more or less overlapping area C1, C2, C3, C4 of the geographical area 4. Each antenna A1, A2, A3, A4 is controlled by a base station connected to a mobile switching center (e.g. MSC) of the mobile radio network 2. The antennas A1, A2, A3, A4 are identified by their identification id in the network, which correspond to the areas C1, C2, C3, C4.

In FIG. 1, reference numeral 3 refers to a computer system connected to the mobile radio network 2. Computer system 3 includes one or more computers, for example personal computers or servers, comprising one or more processors. Computer system 3 further comprises at least one data entry and display terminal 38 connected to at least one of its computers. Furthermore, computer system 3 comprises a data store 30, e.g. a database and/or one or more data files and various functional modules namely a sub-area definition module 31, a field strength prediction module 32, an antenna probability calculation module 33, an antenna determination module 34, a location probability calculation module 35, and a location determination module 36. Preferably, the functional modules and the data store 30 are implemented as programmed software modules. The computer program code of the software modules is stored in a computer program product, i.e. in a computer readable medium, either in memory integrated in a computer of computer system 3 or on a data carrier which can be inserted into a computer of computer system 3. The computer program code of the software modules controls the computer(s) of computer system 3 so that the computer system 3 executes various functions described in the following paragraphs with reference to FIGS. 2 to 4.

Figure 2:
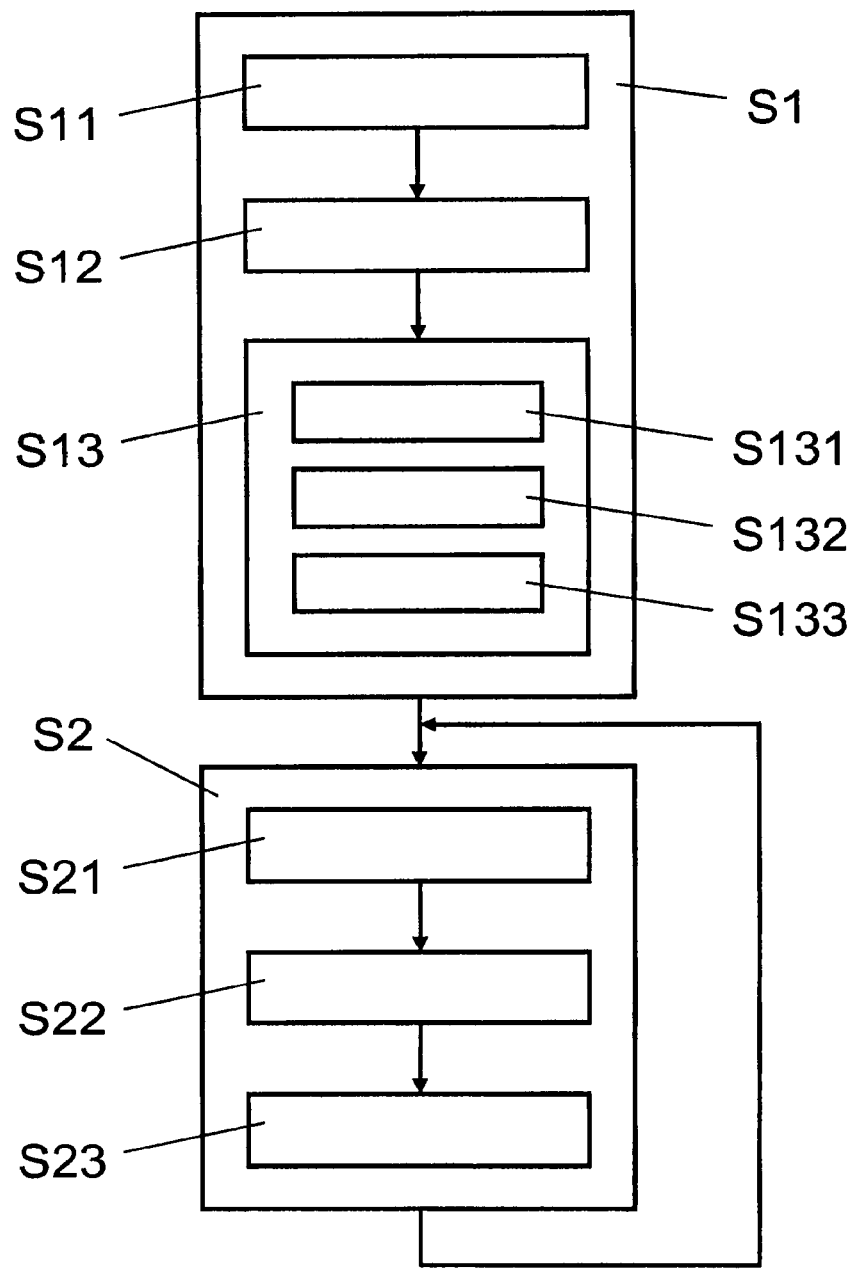
FIG. 2 shows a flow diagram illustrating an example of a sequence of steps executed for locating the mobile communication terminal in a geographical area.

As illustrated schematically in FIG. 2, computer system 3 is configured to perform preparatory step S1 for generating, for all sub-areas 41, 43, antenna probabilities which indicate for each sub-area the probability a mobile communication terminal 1 located in this sub-area uses the respective antenna A1, A2, A3, A4 for registering and/or communicating with the mobile radio network 2. Preparatory step S1 is performed periodically, e.g. monthly, and/or whenever there is a significant change in the radio network, e.g. if an antenna A1, A2, A3, A4 is turned off, a new antenna is added or settings of an antenna are altered.

Furthermore, computer system 3 is configured to perform step S2 for locating the mobile communication terminal 1 in the geographical area 4. Step S2 is performed as requested by a user of data entry terminal 3, a control application running on computer system 3, or a location based service application running on computer system 3 or a remote computer system.

Figure 3:
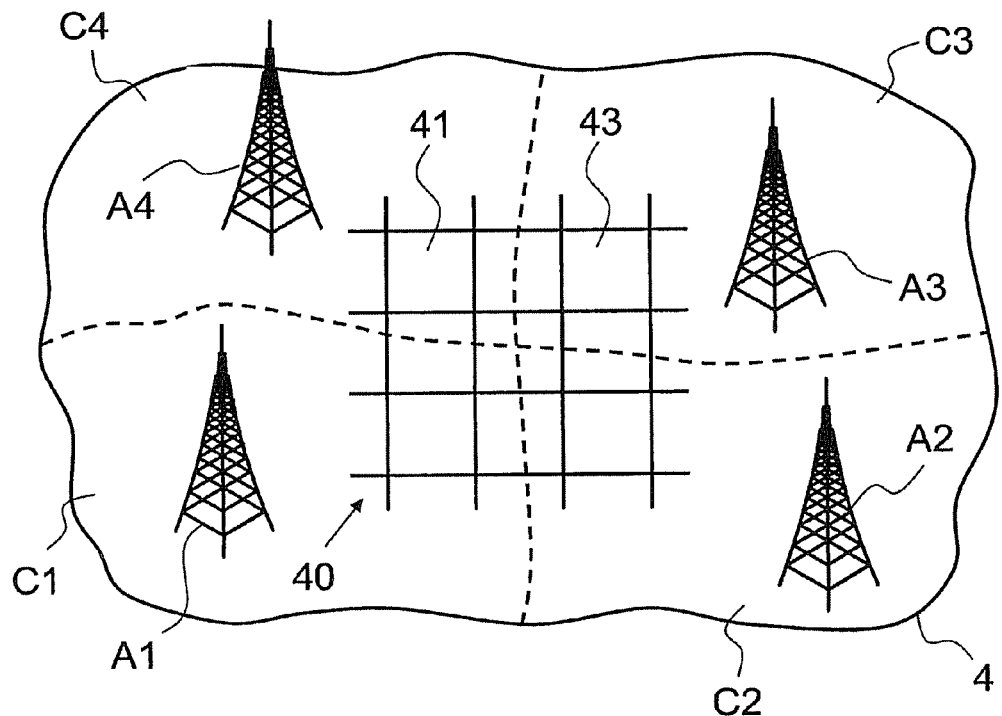
FIG. 3 shows a block diagram illustrating schematically sub-areas of a partial region of a geographical area covered by antennas of the mobile radio network.

In step S11, sub-area definition module 31 divides the geographical area 4 into a plurality of sub-areas 41, 43, as illustrated schematically in FIG. 3. In the example of FIG. 3, the geographical area 4 is divided into a grid 40 of equal-sized squares, each square defining a sub-area 41, 43. For example, the sub-areas 41, 43 are squares of 100 m×100 m. One skilled in the art will understand that alternative shapes of sub-areas are possible, for example, the geographical area 4 may be divided into hexagons arranged in a comb structure. Furthermore, it is also possible to have various sizes of sub-areas, for example smaller sub-areas may be used in zones of increased interest and/or population. Typically, a sub-area is defined by a unique identifier and one or more parameters which describe direct or indirect the position coordinates. Depending on the embodiment, a sub-area is further defined by sub-area type, size and/or shape information. Thus, sub-area definition module 31 defines and stores in the data store 30 a list or array comprising the defined sub-areas 41, 43 of the geographical area 4. In an embodiment, the sub-area definition module 31 is configured to read the definition of the sub-areas from a data file.

In an embodiment, the sub-area definition module 31 is configured to support manual or file based entry of the antenna probability of antennas, which would require in the following steps a full 3D modeling of radio propagation, taking into account the exact position of the antenna inside of a 3D physical environment, as for example an enclosed space such as in a tunnel, or on different floors in shops or railway stations. As there are not many of these enclosed antennas and the propagation of the radiation does usually follow the physical shape of the environment where they are installed, the antenna probability of the enclosed antennas are manually acquired based on maps where these antennas are located and loaded into the data store 30. In an embodiment shapes assigned to enclosed antennas are loaded into the data store 30 and all antenna probabilities are set to 100% when the sub-area is inside an enclosed space including an enclosed antenna.

In step S12, field strength prediction module 32 calculates, for all the sub-areas 41, 43 defined for the geographical area 4, the field strengths expected in the respective sub-area 41, 43 from the antennas A1, A2, A3, A4 of the mobile radio network 2, considering data about topography and power characteristics associated with the antennas A1, A2, A3, A4. Field strength prediction modules 32 are available commercially, e.g. offered by Aricom International. Preferably, only the antennas A1, A2, A3, A4 having the highest expected field strength values are stored for a sub-area 41, 43 in data store 30. For example, the field strength values are stored for a defined (configurable) number of the strongest antennas A1, A2, A3, A4, e.g. for the seven or fourteen strongest antennas. Table 1 shows exemplary entries of expected field strengths in data store 30. In the example of Table 1, a field strength of −41 dBm is expected in sub-area 41 for antenna A4, whereas a field strength of −52 dBm is expected in the same sub-area for antenna A1; likewise, in sub-area 43, a field strength of −42 dBm is expected for antenna A3, whereas a field strength of −48 dBm is expected for antenna A4. In addition or as an alternative to a unique identifier, antenna data may include antenna coordinates or grid positions, for example. Moreover, in addition to the field strength value, further field strength data may include standard deviations for the expected field strength distribution of the antenna in the respective sub-area. Thus, the field strength for a given sub-area i is preferably modeled as a random variable having a normal distribution with expected value $d_i$ and standard deviation $s_i$. Modeling the field strength as a distribution is necessary because the real field strengths do have big variations, depending on the exact position inside the sub-area, location of buildings, weather conditions, how the mobile communication terminal is oriented in space and many other factors. Instead of considering all these factors into the model calculation, the resulting normal distribution can be used and its standard deviation measured in field tests where the real field strengths are compared with expected field strengths for many test calls.

TABLE 1

| sub-area | | antenna | | expected field strength | |
|---|---|---|---|---|---|
| sub-area identifier | sub-area data | antenna identifier | antenna data | field strength value | further field strength data |
| ... | ... | ... | ... | ... | ... |
| 41 | ... | A4 | ... | −41 dBm | ... |
| 41 | ... | A1 | ... | −52 dBm | ... |
| 41 | ... | A3 | ... | −55 dBm | ... |
| ... | ... | ... | ... | ... | ... |
| 43 | ... | A3 | ... | −42 dBm | ... |
| 43 | ... | A4 | ... | −48 dBm | ... |
| 43 | ... | A2 | ... | −51 dBm | ... |
| ... | ... | ... | ... | ... | ... |

In step S13, antenna probability calculation module 33 determines for each sub-area 41, 43 the antenna probabilities for the antennas A1, A2, A3, A4.

In sub-step S131, based on the expected field strength values stored in the database or collection of files 30, antenna probability calculation module 33 calculates for each sub-area 41, 43 the antenna probabilities, i.e. the probability in the respective sub-area 41, 43, the antenna A1, A2, A3, A4 is being used by a mobile communication terminal 1 for registering and/or communicating with mobile radio network 2, as outlined below.

Figure 4:
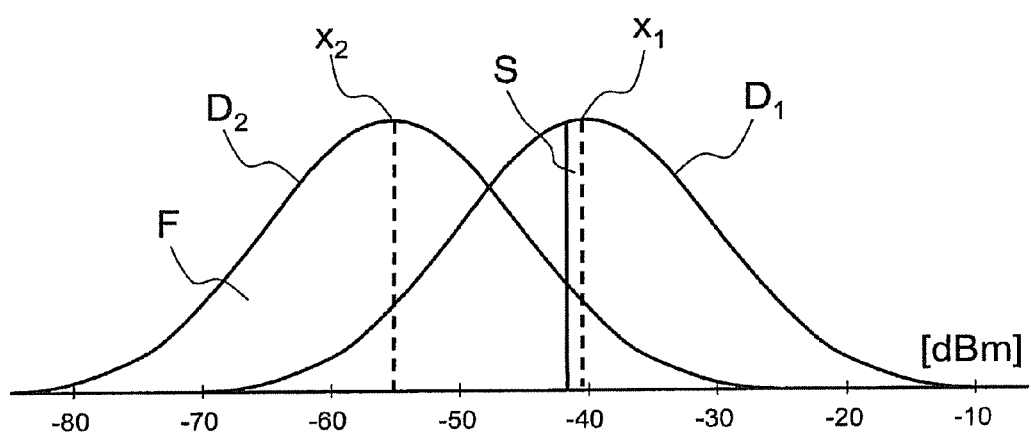
FIG. 4 shows a graph illustrating exemplary distributions of the field strengths expected in a sub-area from two different antennas.

In FIG. 4, $x_1$ refers to the expected field strength (here −41 dBm) of an antenna A1 at a given location, i.e. in a given sub-area 41, 43. Reference numeral $D_1$ refers to the distribution of the real field strength which can be measured at this sub-area with a mobile communication terminal. In this sample it is likely that the real field strength will be around −41 dBm, but sometimes the field strength is −45 dBm, sometimes −37 dBm, it will change depending on the precise location within the sub-area 41, 43, e.g. within the 100 m×100 m square, the weather, the type of terminal, how the terminal is oriented in space, etc. Likewise, $x_2$ refers to the expected field strength (here −55 dBm) of another antenna A2 in the same sub-area 41, 43, and reference numeral $D_2$ refers to the distribution of the real field strength of antenna A2. For calculating the probability that the mobile communication terminal 1 will use antenna A1 in the respective sub-area 41, 43, distribution $D_1$ of the real field strength of antenna A1 is divided into small sectors, such as sector S showing the probability that the real field strength of antenna A1 is in a small range between −40 dBm and −41 dBm. For calculating the probability the real field strength of antenna A1 is between −40 dBm and −41 dBm, and higher than the real field strength of antenna A2 (resulting in the use of antenna A1), the following two probabilities are used:

1) Probability that the real field strength of antenna A1 is between −40 dBm and −41 dBm, which corresponds to the area of section S between −40 dBm and −41 dBm; and
2) Probability that the real field strength of antenna A2 will be less than −41 dBm, which corresponds to area F below −41 dBm.

As probabilities 1) and 2) are independent, the probability that both conditions are met at the same time can be calculated by multiplying the probabilities 1) and 2) (product of areas S and F).

The above calculated probability is restricted to the case where antenna A1 is between −40 dBm and −41 dBm. For calculating the probability 3) for all real fields strengths of antenna A1, the limit is calculated for all summed products of S and F for all real field strengths between − infinity to + infinity, while letting the width of the sector S go to zero. This results in the following integral:

$$p_{A1} = \int_{-\infty}^{\infty} N(x, d_{A1}, s_{A1}) \cdot F(x, d_{A2}, s_{A2}) \cdot dx$$

$N(x, d_{A1}, S_{A1})$ is the normal distribution of the real field strength x of antenna A1, with expected power level $d_{A1}$ and standard deviation $s_{A1}$:

$$N(x, d_{A1}, s_{A1}) = \frac{1}{s_{A1}\sqrt{2\pi}} e^{-\frac{1}{2}\left(\frac{x-d_{A1}}{s_{A1}}\right)^2}$$

$F(x, d_{A2}, s_{A2})$ is the probability the real field strength y of the antenna A2 with expected power level $d_{A2}$ and standard deviation $s_{A2}$ is lower than x:

$$F(x, d_{A2}, s_{A2}) = \int_{-\infty}^{x} N(y, d_{A2}, s_{A2}) dy$$

For example, F(−60, −40, 5) is the probability the real field strength will be between − infinity and −60, for a normal distribution at x=−40 and a standard deviation of 5.

Taking into account another antenna A3 is straightforward, as it is another independent condition which has to be met, so the antenna A1 is still used rather than the antennas A2 or A3. So the probability 3) outlined above can be extended with this additional condition, which is the probability that the field strength of antenna A3 is smaller than x. The resulting probability 4) is:

$$p_{A1} = \int_{-\infty}^{\infty} N(x, d_{A1}, s_{A1}) \cdot F(x, d_{A2}, s_{A2}) \cdot F(x, d_{A3}, s_{A3}) \cdot dx$$

More antennas are taken into account the same way as antennas A2 and A3. In addition the variable substitution $d_{A1} <> d_{Ai}$ and $s_{A1} <> s_{Ai}$ does allow to calculate the probability the call will go to one of the other antennas $A_i$. This does allow rephrasing the calculation 4) in a general way. So the antenna probability $p_{Ai}$ 5) that the mobile communication terminal will connect to a given antenna $A_i$ with an expected power level $d_{Ai}$ and standard deviation $s_{Ai}$ is given by:

$$p_{Ai} = \int_{-\infty}^{\infty} N(x, d_{Ai}, s_{Ai}) \cdot \prod_{j=1, j\neq i}^{n} F(x, d_{Aj}, s_{Aj}) \cdot dx$$

In an embodiment, for each network type the same standard deviation is used for $s_{Ai}$. For GMS networks, a deviation of 10 is used, for UMTS networks a deviation of 4. In a further embodiment, higher deviations are used with increased distance of a sub-area 41, 43 from the respective antenna A1, A2, A3, A4. For example, a standard deviation of approximately 8 is used for UMTS networks, if the antenna is located farther than 5 km from the respective sub-area.

As the mobile communication terminals 1 cannot make a call-setup, if the field strength is below a certain value, the lower limit in the formulas outlined above is adjusted from − infinity to a defined (configurable) minimum field strength, depending on the network type of the cell being GSM or UMTS, for example. Furthermore, as the mobile communication terminal 1 and the mobile radio network 2 do not distinguish in the antenna selection field strength values higher than a defined (configurable) value, e.g. −40 dBm, all expected field strength values above this value are limited to this value.

The integral cannot be solved algebraically. As the input data is imprecise, it is not necessary to have an infinite precision in the probability calculation. So $N(x, d_i, s_i)$ can be approximated by 0 in the regions of $x \leq d_i - 5s_i$ and $x \geq d_i + 5s_i$. Which is the same as when the boundaries $]-\infty, \infty[$ are replaced by $[d_i - 5s_i, d_i + 5s_i]$. In a next approximation step the interval is divided into a finite number of segments, e.g. 10 or 20, for numerical integration with the Simpson's method. For speeding up the automatic computation, values of $N(x_k, 0, 1)$ and $F(y_k, 0, 1)$ can be precomputed and stored for different values of $x_k$ or $y_k$, respectively.

In step S132, antenna probability calculation module 33 sets the antenna probabilities of enclosed antennas to the values loaded in step S11 into data store 30. In an embodiment all antenna probabilities are set to 100%, which are inside enclosed spaces assigned to enclosed antennas, which were loaded before in step S11 into data store 30.

In step S133, antenna probability calculation module 33 takes into account mobile communication terminals, configured to switch automatically between different networks as for example GSM or UMTS. This does affect the location area. The implementation of antenna probability calculation module 33 depends on how multiband mobile communication terminals select the network type. This has to be estimated in the field or in a lab using multiband terminals with different signal levels from multiple networks. In an embodiment of antenna probability calculation module 33, for GSM and UMTS, the antenna probabilities are calculated separate for each network, as according to the measurements multiband mobile communication terminals always prefer UMTS whenever available. This way no terminal detection is necessary. It does only have the disadvantage that GSM areas could be smaller for multiband mobile communication terminals in GSM areas, where there is UMTS coverage as long as UMTS is not turned off on the mobile communication terminal. In an embodiment, it is possible to use a mobile communication terminal detection and calculate the GSM areas for multiband mobile communication terminals separately; setting on each sub-area the antenna probability of all GSM antennas to zero if there is an UMTS antenna available with more than a defined (configurable) minimum field strength.

The antenna probabilities resulting from step S13 are stored temporarily for each antenna in the memory of the computer system 3 or in data store 30. For example, the antenna probabilities are stored for a defined (configurable) number of the strongest antennas A1, A2, A3, A4, e.g. for the seven or fourteen strongest antennas. Table 2 shows exemplary entries of calculated antenna probabilities in data store 30. In the example of Table 2, for sub-area 41, it is expected that with a probability of 50% antenna A4 will be used, whereas the probability of antenna A1 is 25%; likewise, for sub-area 43, a probability of 40% is expected for antenna A3, whereas a probability of 35% is expected for antenna A4. One skilled in the art will understand that Tables 1 and 2 may be combined in one or more files or in a common table.

TABLE 2

| sub-area | | antenna | | |
|---|---|---|---|---|
| sub-area identifier | sub-area data | antenna identifier | antenna data | antenna probability |
| ... | ... | ... | ... | ... |
| 41 | ... | A4 | ... | 50% |
| 41 | ... | A1 | ... | 25% |
| 41 | ... | A3 | ... | 15% |
| ... | ... | ... | ... | ... |
| 43 | ... | A3 | ... | 40% |
| 43 | ... | A4 | ... | 35% |
| 43 | ... | A2 | ... | 10% |
| ... | ... | ... | ... | ... |

In step S21, antenna determination module 34 determines for a particular mobile communication terminal 1 the antenna A1, A2, A3, A4 used, i.e. the antenna currently or last used, from identification data provided by the mobile radio network 2, e.g. cell identifier or base station identifier. In different embodiments and/or applications, this information is obtained by antenna determination module 34 from the MSC of the mobile radio network 2, the Home Location Register (HLR) associated with the mobile communication terminal 1, or the Visitor Location Register (VLR) or another network component of the mobile radio network 2. In a further embodiment, antenna determination module 34 is configured to send a message to the mobile communication terminal 1, e.g. an (invisible) SMS (Short Messaging Services) or USSD (Unstructured Supplementary Service Data) message, to trigger the mobile communication terminal 1 to use an antenna A1, A2, A3, A4 from the current location and, thus, update the respective identification information in the mobile radio network 2. In a further embodiment, the antenna determination module 34 is configured to receive identification information for defining the antenna used by the user or the mobile communication terminal 1, respectively, from an operator or a software application, for example.

In step S22, location probability calculation module 35 calculates for each sub-area of an antenna a location probability, which is the probability that the user is in the respective sub-area.

In an embodiment location probability calculation module 35 first reduces the size of the user location areas using additional parameters from the network, obtained by antenna determination module 34, for example TA (timing advance) or RTT (round trip time). These parameters can be used to indicate the probability the sub-area does have the respective parameter, depending on the distance between the sub-area and antenna. Field tests are made in advance to estimate the distribution of distance for each possible value of one of these parameters. If, depending on the network 2, antenna determination module 34 is able to deliver such a parameter, for example for a call timing advance of four (4), it is possible to calculate the probability that both will happen: the mobile communication terminal 1 selects at a sub-area a given antenna AND the network parameter from antenna determination module 34 is four (4). As both conditions are independent the combined probability can be calculated multiplying the antenna probability and the probability for the parameter from antenna determination module 34 being four (4). The resulting combined probability is used in the following steps as an improvement for the antenna probability calculated before.

The sum of all location probabilities of an antenna is one (1), as it is known from the network which antenna is used. This allows calculating the distribution of location probability $P_u$ in all sub-areas from the antenna probability $P_{Ai}$ calculated in the steps before and the total antenna probability of all n sub-areas:

$$P_{Li} = \frac{P_{Ai}}{\sum_n P_{Aj}},$$

The calculated location probabilities are calculated and stored for each antenna and its sub-areas 41, 43 in data store 30. It must be noted that one antenna can have one or more sub-areas 41, 43 with a location probability >0, and one sub-area 41, 43 can have more than one antenna with a location probability >0.

In an embodiment, location probability calculation module 35 reduces the size of areas with a minimal antenna probability using a sequence of historical location determinations, calculating for each location determination the location probability as in the steps before, calculating for each location determination the time until the last location determination, calculating for each location determination the maximum distance the user can have traveled in all directions and spreading for each location determination all probabilities of the respective sub-area in the range between zero and the max distance. The resulting location probabilities for each location determination are then blended multiplying the resulting location probabilities. The resulting combined location probabilities are used in the following steps as an improvement for the location probabilities calculated before.

In step S23, location determination module 36 optimizes the location probabilities, correcting in this last step errors which are caused by limitations of the granularity of the grid or input data used for calculating the field strength predictions. In one embodiment, to correct for errors caused by the limitation of the granularity of the grid or comb structure, for each antenna all location probabilities >0 are expanded at the border twice the size of the grid, e.g. 200 meters. In another embodiment, the location determination module 36 is further configured to show the resulting location probabilities for each antenna A1, A2, A3, A4 graphically on a display of data entry terminal 38, the sub-areas 41, 43 having a location probability >0, for example color coded in a way a high value of the location probability correlate with color schemas as for example black/grey/white or different shades of one or more colors like, for example, white, blue and red. In yet another embodiment, e.g. in order to adhere to government regulations, generated and displayed is a location area, based on the determined location probabilities, for example an elliptical location area, representative of the geographical area where the mobile communication terminal 1 is expected to be located when the respective antenna was used by the mobile communication terminal 1. In a further embodiment, computer system 3 comprises a communication module configured to transmit the determined location probabilities, a graphic representation of the location probabilities and/or the (elliptical) location area to a mobile communication terminal 1. In this further embodiment, the mobile communication terminal 1 is configured to show the received location probabilities and/or location area on a map, e.g. using geographical information services such as Google Maps by Google Inc.

What is claimed is:

1. A method, comprising:
   determining signal source probabilities for a plurality of sub-areas of a geographic area covered by a plurality of signal sources, wherein, for each one of the plurality of sub-areas:
   the signal source probabilities are determined based on probable field strengths of the plurality of signal sources for the one of the plurality of sub-areas; and
   the signal source probabilities indicate the probability that a mobile device, located in the one of the plurality of sub-areas, is operable to detect a particular signal source for communicating.

2. The method of claim 1, wherein determining the signal source probabilities comprises calculating expected field strengths in the plurality of sub-areas.

3. The method of claim 1, wherein determining the signal source probabilities comprises obtaining power information indicating a detected power of respective signals received by the mobile device from multiple transmitters.

4. The method of claim 1, wherein the plurality of sub-areas of the geographic area comprise a plurality of sample positions, each sample position being a possible location of the mobile device.

5. The method of claim 1, comprising determining known locations of the plurality of signal sources using at least the signal source probabilities.

6. The method of claim 1, comprising determining a probability model based on the signal source probabilities.

7. The method of claim 6, wherein the probability model is a three dimensional model.

8. The method of claim 1, comprising determining each signal source probability based at least in part on power of a first signal and at least in part on power of a second signal as measured in a sub-area, wherein the first signal originates from a first transmitter and the second signal originates from a second transmitter.

9. The method of claim 1, wherein the plurality of sub-areas form a geographic grid.

10. The method of claim 9, wherein the geographic grid is a three-dimensional space having a length, a width, and a height.

11. A system, comprising:
    one or more computers; and
    a non-transitory storage device storing instructions operable to cause the one or more computers to perform operations comprising:
    determining signal source probabilities for a plurality of sub-areas of a geographic area covered by a plurality of signal sources, wherein, for each one of the plurality of sub-areas:
    the signal source probabilities are determined based on probable field strengths of the plurality of signal sources for the one of the plurality of sub-areas; and
    the signal source probabilities indicate the probability that a mobile device, located in the one of the plurality of sub-areas, is operable to detect a particular signal source for communicating.

12. The system of claim 11, wherein determining the signal source probabilities comprises calculating expected field strengths in the plurality of sub-areas.

13. The system of claim 11, wherein determining the signal source probabilities comprises obtaining power information indicating a detected power of respective signals received by the mobile device from multiple transmitters.

14. The system of claim 11, wherein the plurality of sub-areas of the geographic area comprise a plurality of sample positions, each sample position being a possible location of the mobile device.

15. The system of claim 11, wherein the operations comprise determining known locations of the plurality of signal sources using at least the signal source probabilities.

16. The system of claim 11, wherein the operations comprise determining a probability model based on the signal source probabilities.

17. The system of claim 16, wherein the probability model is a three dimensional model.

18. The system of claim 11, wherein each signal source probability is determined based at least in part on power of a first signal and at least in part on power of a second signal as measured in in a sub-area, the first signal originates from a first transmitter and the second signal originates from a second transmitter.

19. The system of claim 11, wherein the plurality of sub-areas form a geographic grid.

20. The system of claim 19, wherein the geographic grid is a three-dimensional space having a length, a width, and a height.

* * * * *